(12) United States Patent
Shi et al.

(10) Patent No.: US 11,908,121 B2
(45) Date of Patent: Feb. 20, 2024

(54) CONVEYING MANIPULATOR FOR MACHINING PRECISION PARTS

(71) Applicant: NANJING PIONEER AWARENESS INFORMATION TECHNOLOGY CO., LTD, Nanjing (CN)

(72) Inventors: Zhengying Shi, Nanjing (CN); Weike Xin, Nanjing (CN); Shu Li, Nanjing (CN); Liewei Wang, Nanjing (CN); Jie Lian, Nanjing (CN); Youqun Huang, Nanjing (CN); Haidong Lu, Nanjing (CN); Yang Li, Nanjing (CN); Peiyao Li, Nanjing (CN); Guoqiang Wu, Nanjing (CN); Baoqian Xia, Nanjing (CN)

(73) Assignee: NANJING PIONEER AWARENESS INFORMATION TECHNOLOGY CO., LTD, Nanjing (CN)

( * ) Notice: Subject to any disclaimer, the term of this patent is extended or adjusted under 35 U.S.C. 154(b) by 0 days.

(21) Appl. No.: 18/446,004

(22) Filed: Aug. 8, 2023

(65) Prior Publication Data

US 2023/0386006 A1 Nov. 30, 2023

Related U.S. Application Data

(63) Continuation of application No. PCT/CN2021/121671, filed on Sep. 29, 2021.

(30) Foreign Application Priority Data

Feb. 22, 2021 (CN) .......................... 202110195026.6

(51) Int. Cl.
*G01B 11/16* (2006.01)
*G06T 7/00* (2017.01)
(Continued)

(52) U.S. Cl.
CPC ............ *G06T 7/0002* (2013.01); *G01B 11/16* (2013.01); *G06T 7/11* (2017.01); *G06T 7/13* (2017.01);
(Continued)

(58) Field of Classification Search
CPC ......... G01B 11/16; G06T 7/0002; G06T 7/11; G06T 7/13; G06T 7/248;
(Continued)

(56) References Cited

U.S. PATENT DOCUMENTS 8,845,107 B1 * 9/2014 Coley ..................... H04N 7/18
353/30
2003/0145658 A1 8/2003 Weithe et al.
(Continued)

FOREIGN PATENT DOCUMENTS

AU 2021428062 A1 6/2023
CN 101270982 A * 9/2008
(Continued)

OTHER PUBLICATIONS

Jenkins et al. ("An imaging system for visual inspection and structural condition monitoring of railway tunnels," IEEE Workshop on Environmental, Energy, and Structural Monitoring Systems; Date of Conference: Jul. 24-25, 2017) (Year: 2017).*

(Continued)

*Primary Examiner* — Yubin Hung

(57) ABSTRACT

Provided are a method and a device for real-time monitoring of tunnel deformation. The monitoring method includes: S1, erecting a plurality of structured light sources in an unstable area to be monitored of a tunnel structure, and erecting a monitoring terminal in a relatively stable region of the tunnel structure, where the monitoring terminal may communicate with the plurality of structured light sources; S2, observing all structured lights in the unstable area of the
(Continued)

tunnel structure and obtaining structured light curves in real time by the monitoring terminal; S3, analyzing imaging changes of the structured lights, detecting deformation degrees and offset distances of the tunnel in real time, and monitoring the diseases such as settlement, convergence of a single-section of the tunnel and integral settlement of a multi-section of the tunnel by the data processing unit.

6 Claims, 6 Drawing Sheets

(51) Int. Cl.
    *G06T 7/11*     (2017.01)
    *G06T 7/13*     (2017.01)
    *G06T 7/246*     (2017.01)
    *H04N 7/18*     (2006.01)

(52) U.S. Cl.
    CPC ............ *G06T 7/248* (2017.01); *H04N 7/181* (2013.01); *G06T 2207/20021* (2013.01); *G06T 2207/30184* (2013.01)

(58) Field of Classification Search
    CPC ........... G06T 2207/20021; G06T 2207/30184; H04N 7/181
    See application file for complete search history.

(56) References Cited

U.S. PATENT DOCUMENTS

| | | | |
|---|---|---|---|
| 2013/0238532 A1 | 9/2013 | Kearns et al. | |
| 2015/0145959 A1* | 5/2015 | Tang | G06T 7/246 348/46 |
| 2018/0038683 A1* | 2/2018 | Yuan | G01B 11/16 |
| 2018/0061034 A1* | 3/2018 | Zhao | G01B 11/2513 |
| 2019/0197340 A1* | 6/2019 | Li | G06T 7/521 |
| 2020/0353956 A1* | 11/2020 | Liu | G06T 7/246 |

FOREIGN PATENT DOCUMENTS

| | | | | |
|---|---|---|---|---|
| CN | 101458069 A | * | 6/2009 | |
| CN | 103017673 A | | 4/2013 | |
| CN | 103438823 A | | 12/2013 | |
| CN | 204007533 U | | 12/2014 | |
| CN | 105809668 A | | 7/2016 | |
| CN | 107655898 A | | 2/2018 | |
| CN | 109373926 A | | 2/2019 | |
| CN | 109681275 A | | 4/2019 | |
| CN | 110926339 A | * | 3/2020 | |
| CN | 111307043 A | * | 6/2020 | |
| CN | 111855664 A | | 10/2020 | |
| CN | 112097669 A | | 12/2020 | |
| CN | 112556600 A | | 3/2021 | |
| JP | 2001289620 A | | 10/2001 | |
| WO | WO-2019033862 A1 | * | 2/2019 | ............ B61D 15/00 |

OTHER PUBLICATIONS

Guo et al. ("Research on tunnel complete profile measurement based on digital photogrammetric technology," Proceedings of 2011 IEEE International Conference on Service Operations, Logistics and Informatics; Date of Conference: Jul. 10-12, 2011) (Year: 2011).*
First Office Action for China Application No. 202110195026.6.
Notice of Registration for China Application No. 202110195026.6, dated Apr. 20, 2021.
International Search Report for PCT/CN2021/121671, dated Jan. 18, 2022.
Written Opinion for PCT/CN2021/121671, dated Jan. 18, 2022.

* cited by examiner

CONVEYING MANIPULATOR FOR MACHINING PRECISION PARTS

CROSS-REFERENCE TO RELATED APPLICATIONS

This disclosure is a continuation of PCT/CN2021/121671, filed on Sep. 29, 2021 and claims priority to Chinese Patent Application No. 202110195026.6, filed on Feb. 22, 2021, the contents of which are hereby incorporated by reference.

TECHNICAL FIELD

The disclosure relates to the field of tunnel structure deformation monitoring, and in particular to a method and a device for real-time monitoring of tunnel deformation.

BACKGROUND

Tunneling methods of a tunnel under construction mainly include a blasting method and a shield method. The shield method is mainly used in subway tunnel construction. This method has characteristics of a relatively stable structure and a high cost, with simultaneous cutter head excavation, slag transportation, segment sticking and track laying. The blasting method is mainly used in construction of high-speed railway tunnels. First, blasting is carried out in on a tunnel face, and then I-beams are erected and cement is poured to form an initial supporting area. A deformation rate in the initial supporting area is high, making it highly susceptible to disasters such as tunnel settlement and convergence, requiring real-time monitoring of deformation. After the initial supporting area is formed, the cement is poured to form a permanent tunnel structure called an invert closure area and a secondary lining area. After this area is formed, the structure belongs to a relatively stable area, and the tunnel structure is basically stable after secondary lining is completed.

Currently, a total station is usually used for measuring in structure deformation monitoring of a tunnel under construction. When tunneling the tunnel under construction, a plurality of reflective prisms (usually 3-7) are needed to be installed at fixed intervals at a top of the tunnel by manual installation. The installation of the reflective prisms is inconvenient and poses certain construction safety hazards. Construction needs to be stopped to use the total station for manual monitoring during detection, and a detection interval is generally 2 to 4 hours. This detection method is time-consuming and laborious, and delays a construction progress.

In addition, the above current monitoring method using the total station may only monitor 3 to 7 points in each section of the tunnel, which is very sparse. Moreover, a time interval of monitoring deformation is relatively long. If a disaster accident occurs during a monitoring window, the disaster accident may not be effectively warned.

A moving detection vehicle is usually used for an operation tunnel, and structured light sources and image sensors are deployed on the detection vehicle. However, this detection method may not be used in the tunnel under construction using the blasting method, and has characteristics of a long detection period and non real-time detection.

Therefore, there is an urgent need to develop a monitoring method of tunnel structure deformation that may be conveniently deployed in both an operation tunnel and a tunnel under construction, without installing equipment at a top of the tunnel, and that may monitor deformation of a tunnel structure in real time without an interruption, increasing a monitoring density and a monitoring frequency.

SUMMARY

In order to solve problems existing in the prior art, the disclosure has an objective to provide a method and a device for real-time monitoring of tunnel deformation for monitoring tunnel deformation in real time during construction of a tunnel under construction and during an operation of the tunnel.

In order to achieve the above objective, the method for the real-time monitoring of the tunnel deformation according to the disclosure includes following steps.

S1, a plurality of structured light sources are erected in an unstable area to be monitored of a tunnel structure, and a monitoring terminal is erected in a relatively stable secondary lining area of the tunnel structure, where the monitoring terminal communicates with the plurality of structured light sources.

S2, the monitoring terminal observes all structured lights in the unstable area of the tunnel structure, and obtains structured light curves in real time.

S3, a data processing unit analyzes imaging changes of the structured lights, detects deformation degrees and offset distances of the tunnel in real time, and monitors diseases of settlement, convergence of a single-section of the tunnel and integral settlement of a multi-section of the tunnel.

In one embodiment, the step S3 includes following steps.

S31, the data processing unit locates a structured light area and edges of the structured lights by utilizing an image recognition module.

S32, the data processing unit extracts center curves of the structured light curves.

S33, the data processing unit automatically or manually updates reference curves formed by the center curves.

S34, the data processing unit detects states of the tunnel structure, and judges whether the disasters of the settlement, convergence of the single-section of the tunnel or the integral settlement of the multi-section of the tunnel occur.

In one embodiment, in the step S34, a method for detecting the states of the tunnel structure by the data processing unit includes following steps.

S341, sections of a tunnel wall are divided into left and right side walls and a vault, lateral and longitudinal displacements of the left and right side walls are detected, and longitudinal displacements of the vault are detected.

S342, the center curves of the real-time structured light curves are matched with the reference curves, a difference calculation algorithm is adopted, pixel deviations before and after the reference curves in different sections of a mask map are compared, and horizontal or vertical displacement changes of pixels are compared one by one, and a maximum deviation is taken as a detection result.

S343, the integral settlement of the multi-section of the tunnel is detected by a combined line difference algorithm, and a matching structure of the center curves of the plurality of structured light curves before and after of the tunnel is combined, and an overall downward shift of the plurality of curves indicates a disease of the integral settlement of the multi-section of the tunnel; and S344, spatial mapping of a settlement amount is performed, pixel displacements are converted into spatial offset distances through pixel quantization to obtain an actual settlement amount, and a disease type is determined according to a displacement direction.

The disclosure also provides a monitoring device for implementing the method for the real-time monitoring of the tunnel deformation, including a plurality of structured light sources and a monitoring terminal. The plurality of structured light sources are erected in the unstable area of the tunnel structure. The monitor terminal is erected in the relatively stable area of the tunnel structure, communicates with and controls the plurality of structured light sources, and includes a data processing unit and a plurality of image sensors.

In one embodiment, the structured light sources are multi-band light sources, and the monitoring terminal senses the multi-band light sources, and measurement results of the multi-band light sources are comprehensively analyzed to obtain a final measurement result.

In one embodiment, the structured light sources have built-in sensors for detecting whether the structured light sources are impacted or not. When impacts are detected, the structured light sources automatically readjust the reference curves of the structured lights.

Beneficial effects are as follows.

Based on an improved structured light machine vision technology, in the method and the device for the real-time monitoring of the tunnel deformation according to the embodiments, the plurality of structured light sources are installed on the side walls of the monitoring area and the monitoring terminal is installed in the relatively stable area. The image sensors of the monitoring terminal detect real-time changes of structured light shapes on an inner wall of the tunnel in the monitoring area, so as to monitor the disasters such as top settlement, two-side convergence, local settlement, integral settlement, surrounding rock instability and the like of the tunnel. The disclosure may not only allow real-time tunnel deformation monitoring during the construction of the tunnel under construction, but also allow the real-time tunnel deformation monitoring in an operation tunnel. Since there is no need to install equipment at the top of the tunnel according to the embodiments, the embodiments may replace a common monitoring method using a total station for the tunnel under construction, and has characteristics of dense monitoring points, an automatic system operation and real-time monitoring.

BRIEF DESCRIPTION OF THE DRAWINGS

The disclosure may be further described and elaborated with attached drawings.

DETAILED DESCRIPTION OF THE EMBODIMENTS

Technical schemes of the disclosure may be explained more clearly and completely by describing preferred embodiments of the disclosure with attached drawings.

Figure 1:
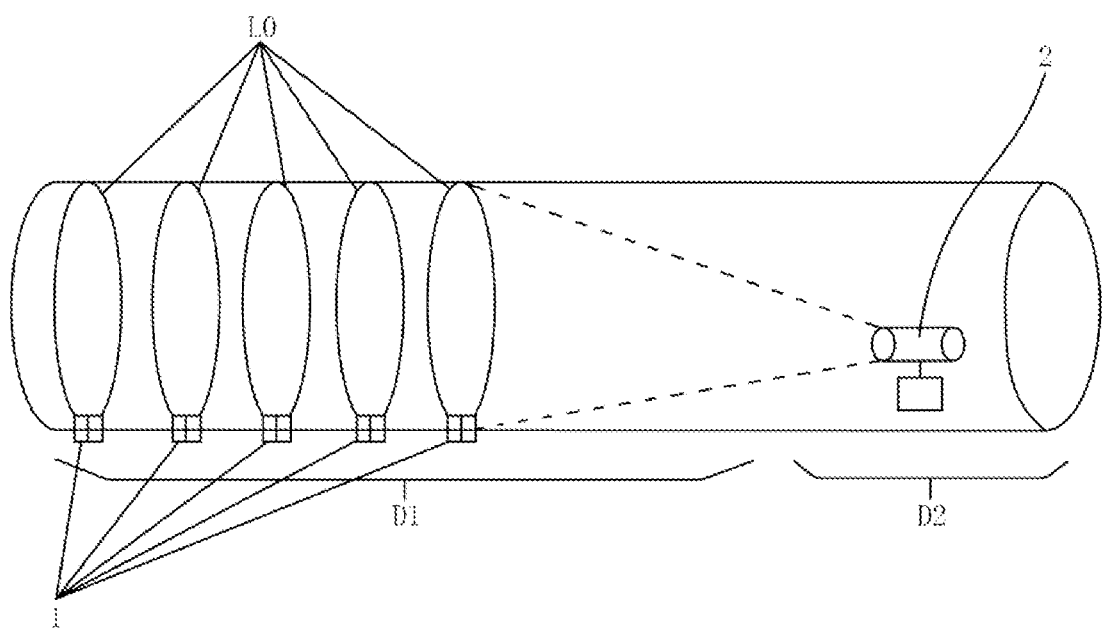
FIG. 1 is a schematic diagram of a device for real-time monitoring of tunnel deformation according to a preferred embodiment of the disclosure.

As shown in FIG. 1, a device for real-time monitoring of tunnel deformation according to the preferred embodiments of the disclosure includes a plurality of structured light sources 1 and a monitoring terminal 2.

The plurality of structured light sources 1 are erected in a tunnel face and an initial supporting area to be monitored, and these areas are collectively referred to as a monitoring area or an unstable area D1. Optionally, the plurality of structured light sources 1 are arranged at equal intervals. The structured light sources 1 are multi-band light sources, the monitoring terminal 2 has a sensing function for the multi-band light sources, and a final measurement result is obtained by a comprehensive analysis of measurement results of the multi-band light sources. The structured light sources 1 have their own targets, and the monitoring terminal 2 obtains position changes (settlement or convergence) of each of the light sources by observing each of the targets. Each of the targets is optionally a cross self-luminous infrared light source. The structured light sources 1 have built-in sensors used for detecting whether the structured light sources 1 are impacted or not. When impacts are detected, the structured light sources 1 cooperate with the monitoring terminal 2 to automatically readjust the reference curves of structured lights.

The monitoring terminal 2 is erected in an invert closure area or a secondary lining area D2, and a stable area. The monitoring terminal 2 communicates with the plurality of structured light sources 1 in a wireless or wired manner, and controls the structured light sources 1 to be turned on at intervals according to detection requirements and a site environment. The structured light sources 1 may be powered by wire or by own batteries. The monitoring terminal 1 includes a data processing unit and a plurality of image sensors. Optionally, two image sensors are used, one image sensor facing the monitoring area D1 and an other image sensor facing the secondary lining area D2.

In other embodiments, a plurality of structured light sources 1 may also be erected in the secondary lining area D2, and the monitoring terminal 2 monitors the plurality of structured light sources in the secondary lining area through the image sensors facing the secondary lining area D2. Whether the monitoring terminal 2 has settled or converged may be sensed by monitoring displacement changes of a plurality of structured lights in the secondary lining area D2, and displacements of the plurality of structured lights 1 in the unstable area may be corrected.

Figure 4:
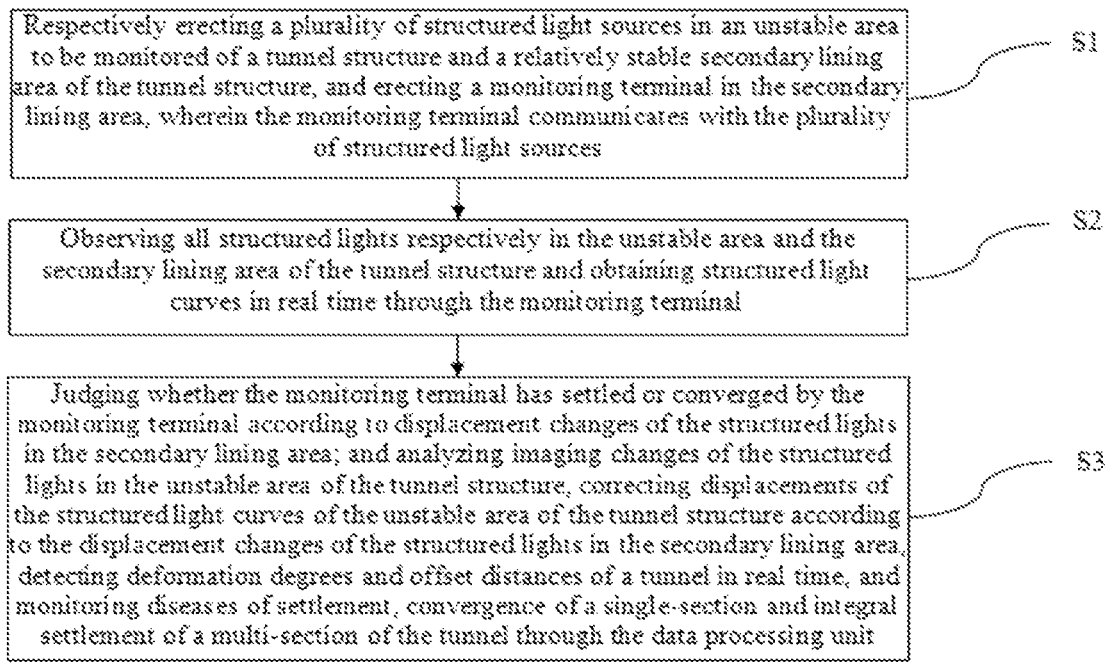
FIG. 4 is a flow chart of a method for real-time monitoring of tunnel deformation according to the disclosure.

As shown in FIG. 4, a monitoring method of the device for the real-time monitoring of the tunnel deformation includes following steps.

S1, the plurality of structured light sources are erected in the unstable area to be monitored of a tunnel structure, and the monitoring terminal is erected in a relatively stable secondary lining area of the tunnel structure, where the monitoring terminal communicates with the plurality of structured light sources.

Optionally, the structured light sources are installed at bottoms of side walls of a tunnel.

S2, the monitoring terminal observes all structured lights L0 in the unstable area of the tunnel structure, and obtains structured light curves in real time.

S3, the data processing unit analyses imaging changes of the structured lights, detects deformation degrees and offset distances of the tunnel in real time, and monitors diseases such as settlement, convergence of a single-section of the tunnel and integral settlement of a multi-section of the tunnel.

Figure 5:
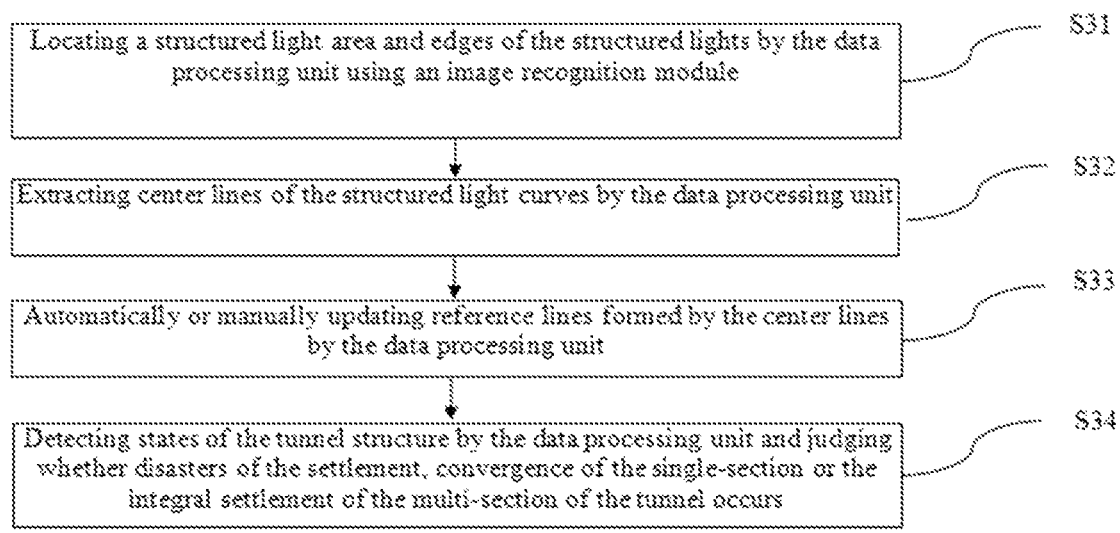
FIG. 5 is a flow chart of S3 in a method for real-time monitoring of tunnel deformation according to the disclosure.

Specifically, as shown in FIG. 5, the above step S3 includes following steps.

S31, the data processing unit locates a structured light area and edges of the structured lights by utilizing an image recognition module.

Optionally, the data processing unit locates the structured light area through adaptive threshold processing, and identifies edges of the structured lights in the area by using a deep learning segmentation network. The segmentation network optionally adopts a semantic segmentation model.

S32, the data processing unit extracts center curves of the structured light curves.

Optionally, the data processing unit adopts a geometric distribution feature extraction algorithm of each light stripe, and distinguishes upper and lower edges of each light stripe through edge detection, and each center curve is a column coordinate average of the two edges, and the edge detection optionally adopts a neighbourhood method.

S33: the data processing unit automatically or manually updates reference curves formed by the center curves.

Specifically, the data processing unit includes a reference curve setting module of the tunnel structure for collecting the center curves of the structured light curves under a normal tunnel structure and saving a mask map for updating.

S34, the data processing unit detects states of the tunnel structure, and judges whether the diseases such as the settlement, convergence of the single-section of the tunnel or the integral settlement of the multi-section of the tunnel occur.

Optionally, the above step S3 further includes: locating the targets of the structured light sources, calculating pixel resolutions in an X direction and a Y direction, and obtaining distances of pixels corresponding to an actual space by the data processing unit, and a deep learning network semantic segmentation model is preferred for the locating.

Figure 6:
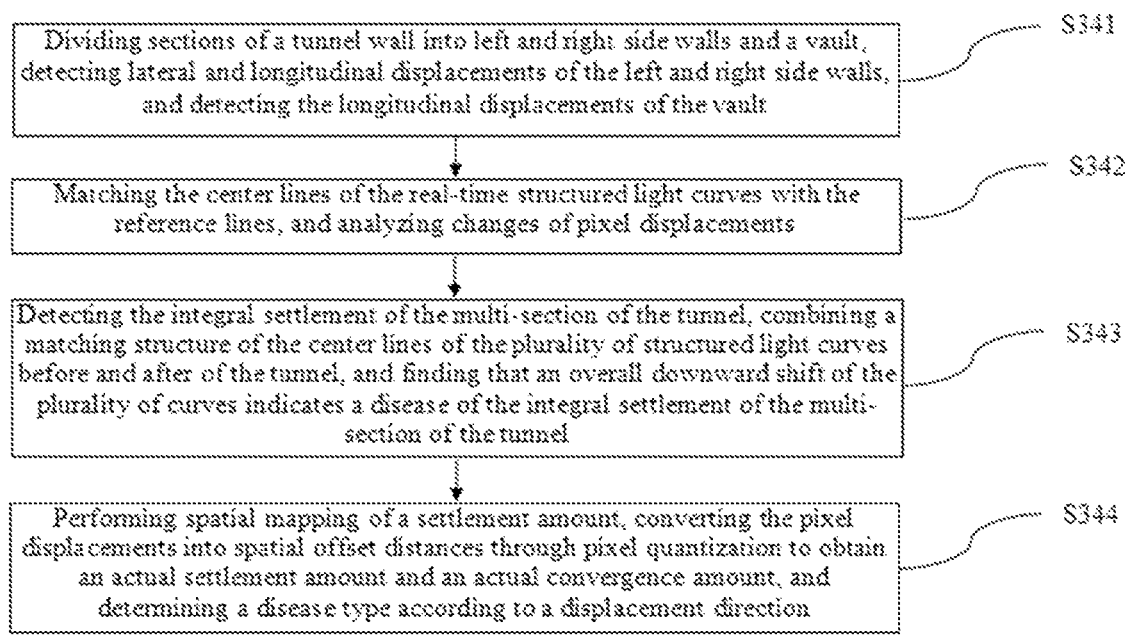
FIG. 6 is a flow chart of a method for detecting the states of the tunnel structure by the data processing unit according to the disclosure.

Specifically, as shown in FIG. 6, a method for detecting the states of the tunnel structure by the data processing unit in the step S34 includes following steps.

Figure 2:
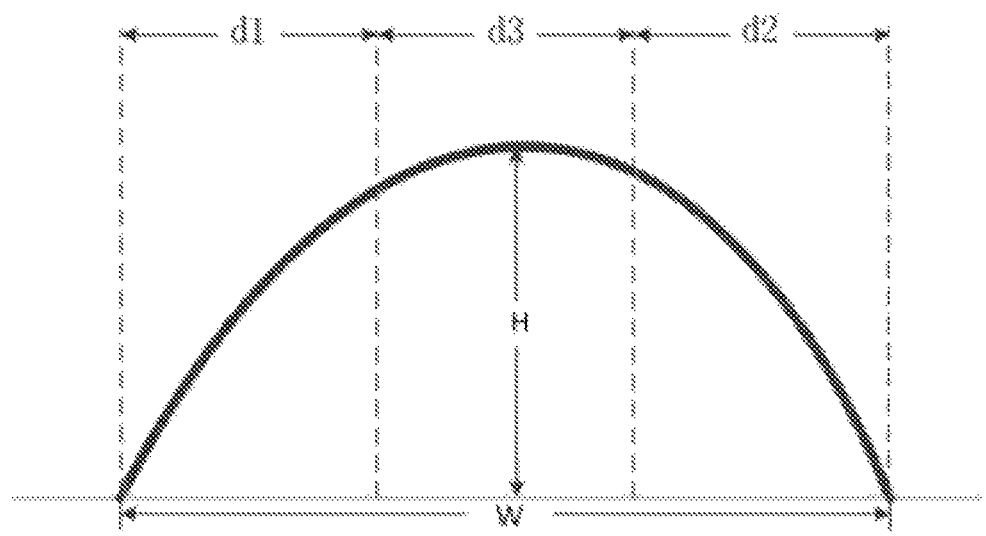
FIG. 2 is a schematic diagram of section division of a tunnel wall by a method for real-time monitoring of tunnel deformation.

S341, sections of a tunnel wall are divided. As shown in FIG. 2, the tunnel wall is divided into a left side wall d1, a right side wall d2, and a vault d3, lateral and longitudinal displacements of the left and right side walls are mainly detected, and longitudinal displacements of the vault are mainly detected.

Figure 3:
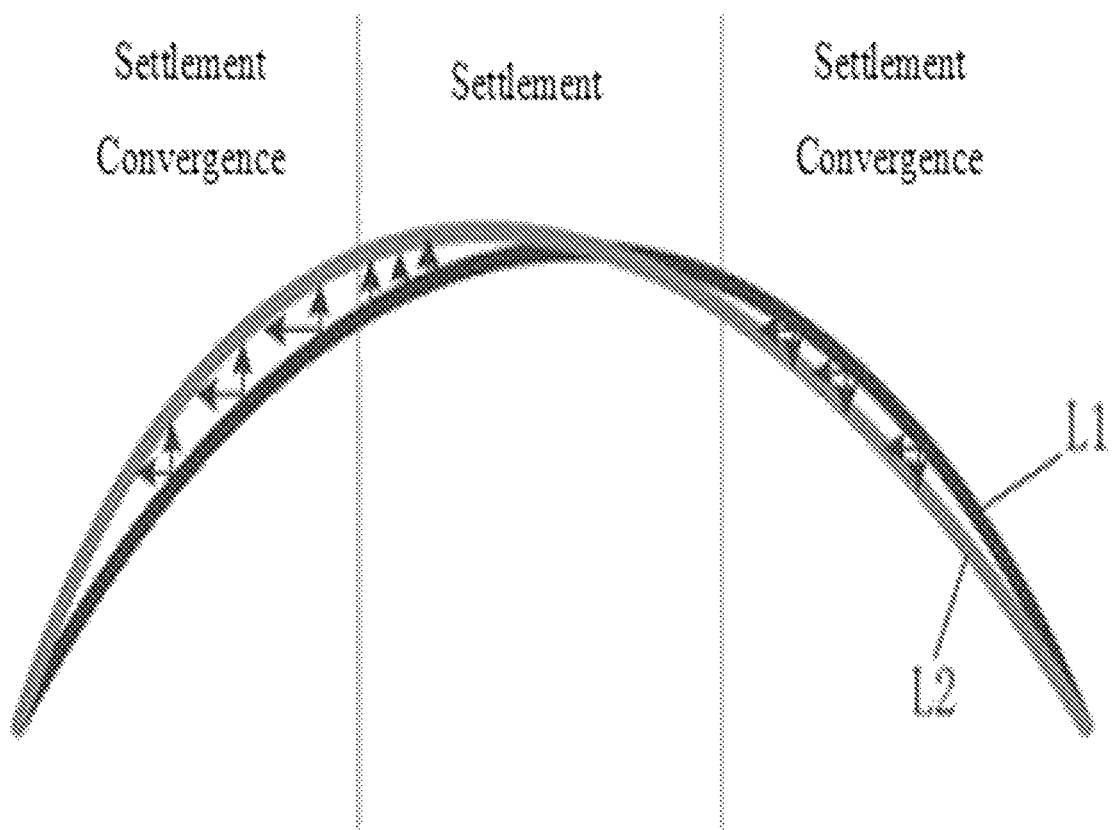
FIG. 3 is a schematic diagram of states of a tunnel structure detected by a method for real-time monitoring of tunnel deformation.

S342, as shown in FIG. 3, a center curve L2 of a real-time structured light curve is matched with a reference curve L1, and pixel deviations before and after the reference curve in different sections of the mask map are compared by using a difference calculation algorithm, and horizontal or vertical displacement changes of the pixels are compared one by one, and a maximum deviation is taken as a detection result.

S343, the integral settlement of the multi-section of the tunnel is detected by a combined line difference algorithm, and a matching structure of the center curves of the plurality of structured light curves before and after of the tunnel is combined, and an overall downward shift of the plurality of curves indicates a disease of the integral settlement of the multi-section of the tunnel.

S344, spatial mapping of a settlement amount is performed, pixel displacements are converted into spatial offset distances through pixel quantization to obtain an actual settlement amount and an actual convergence amount, and a disease type is determined according to a displacement direction.

The above specific embodiments only describe the preferred embodiments of the disclosure, and do not limit a protection scope of the disclosure. Without departing from a design concept and spirit of the disclosure, various modifications, substitutions and improvements of the technical scheme of the disclosure made by ordinary technicians in the field according to a text description and drawings provided by the disclosure shall belong to the protection scope of the disclosure. The protection scope of the disclosure is determined by claims.

What is claimed is:

1. A method for real-time monitoring of tunnel deformation, comprising following steps:
    S1, respectively erecting a plurality of structured light sources in an unstable area to be monitored of a tunnel structure and a stable secondary lining area of the tunnel structure, and erecting a monitoring terminal in the secondary lining area, wherein the monitoring terminal communicates with the plurality of structured light sources;
    S2, acquiring images of all structured lights projected in the unstable area and the secondary lining area of the tunnel structure and obtaining curves corresponding to stripes of the structured light sources from the acquired images in real time through the monitoring terminal;
    S3, judging whether the monitoring terminal has settled or converged by the monitoring terminal according to displacement changes of the structured lights projected in the secondary lining area; and
        analyzing imaging changes of the structured lights in the unstable area of the tunnel structure,
        correcting displacements of the structured light curves of the unstable area of the tunnel structure according to the displacement changes of the structured lights in the secondary lining area,
        detecting deformation degrees and offset distances of a tunnel in real time, and
        monitoring diseases of settlement, convergence of a single-section and integral settlement of a multi-section of the tunnel through a data processing unit.

2. The method for the real-time monitoring of the tunnel deformation according to claim 1, wherein the S3 comprises following steps:
    S31, locating a structured light projected area and edges of the structured light curves by the data processing unit from each of the acquired images using an image recognition module;
    S32, extracting center lines of the structured light curves based on the upper and the lower edges of the curves by the data processing unit;
    S33, automatically or manually updating, by using the data processing unit, saved reference lines formed by the center lines of the structured light curves projected under a normal tunnel structure; and
    S34, detecting states of the tunnel structure by the data processing unit and judging whether disasters of the settlement, convergence of the single-section or the integral settlement of the multi-section of the tunnel occurs.

3. The method for the real-time monitoring of the tunnel deformation according to claim 2, wherein in the S34, a method for detecting the states of the tunnel structure by the data processing unit comprises:

S341, dividing each section of a tunnel wall into left and right side walls and a vault, detecting lateral and longitudinal displacements of the left and right side walls, and detecting the longitudinal displacements of the vault;

S342, matching the center lines of the extracted structured light curves with the reference lines, and analyzing changes of pixel displacements;

S343, detecting the integral settlement of the multi-section of the tunnel by combining a matching structure of the center lines of the plurality of structured light curves from the front to the back of the tunnel to determine an overall downward shift of the plurality of curves as an indication of a disease of the integral settlement of the multi-section of the tunnel; and S344, performing spatial mapping of a settlement amount, converting the pixel displacements into spatial offset distances through pixel quantization to obtain an actual settlement amount and an actual convergence amount, and determining a disease type according to a displacement direction.

4. A monitoring device for implementing the method for the real-time monitoring of the tunnel deformation according to claim 1, comprising a plurality of structured light sources and a monitoring terminal, wherein the plurality of structured light sources are erected in an unstable area of a tunnel structure and a stable secondary lining area of the tunnel structure; and the monitoring terminal is erected in the stable secondary lining area of the tunnel structure, communicates with and controls the plurality of structured light sources, and comprises a data processing unit and a plurality of image sensors.

5. The monitoring device according to claim 4, wherein the structured light sources are multi-band light sources, and the monitoring terminal acquires images of the projected lights of the multi-band light sources, and analyzing the acquired images to obtain a final measurement result.

6. The monitoring device according to claim 4, wherein the structured light sources have built-in sensors for detecting whether the structured light sources are impacted or not; when impacts are detected, the structured light sources automatically readjust reference curves of the structured lights.

* * * * *